US006370555B1

(12) United States Patent
Bartkowiak

(10) Patent No.: US 6,370,555 B1
(45) Date of Patent: Apr. 9, 2002

(54) METHOD AND SYSTEM FOR IMPROVED DETECTION OF ANALOG SIGNALS

(75) Inventor: John G. Bartkowiak, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/160,485

(22) Filed: Sep. 25, 1998

(51) Int. Cl.$^7$ .............................................. G06F 17/10
(52) U.S. Cl. ...................................................... 708/311
(58) Field of Search ................................ 708/311–312

(56) References Cited

U.S. PATENT DOCUMENTS 5,251,256 A * 10/1993 Crowe et al. ............... 708/312
5,477,465 A * 12/1995 Zheng ......................... 708/311

* cited by examiner

Primary Examiner—Tan V. Mai
(74) Attorney, Agent, or Firm—Skjerven Morrill MacPherson LLP

(57) ABSTRACT

A method and system for improved detection of analog signals, where such signals are composed of one or more analog frequencies of defined duration. In the method and system, an analog signal is received. A stream of data samples is created from the received analog signal. Based on the stream of data samples, a duration is calculated for one or more analog frequencies contained within the received analog signal. The duration is calculated for the one or more frequencies by utilizing a calculated signal energy for each of the one or more analog frequencies. The calculated signal energies for each of the one or more analog frequencies are used to determine a number of frequency-specific data samples. The number of frequency-specific data samples are then utilized with a sampling rate to calculate the duration of the each of the one or more analog frequencies. The one or more calculated durations of each of the one or more analog frequencies are utilized to determine whether the analog signal, composed of the one or more analog frequencies of defined duration, is present.

33 Claims, 13 Drawing Sheets

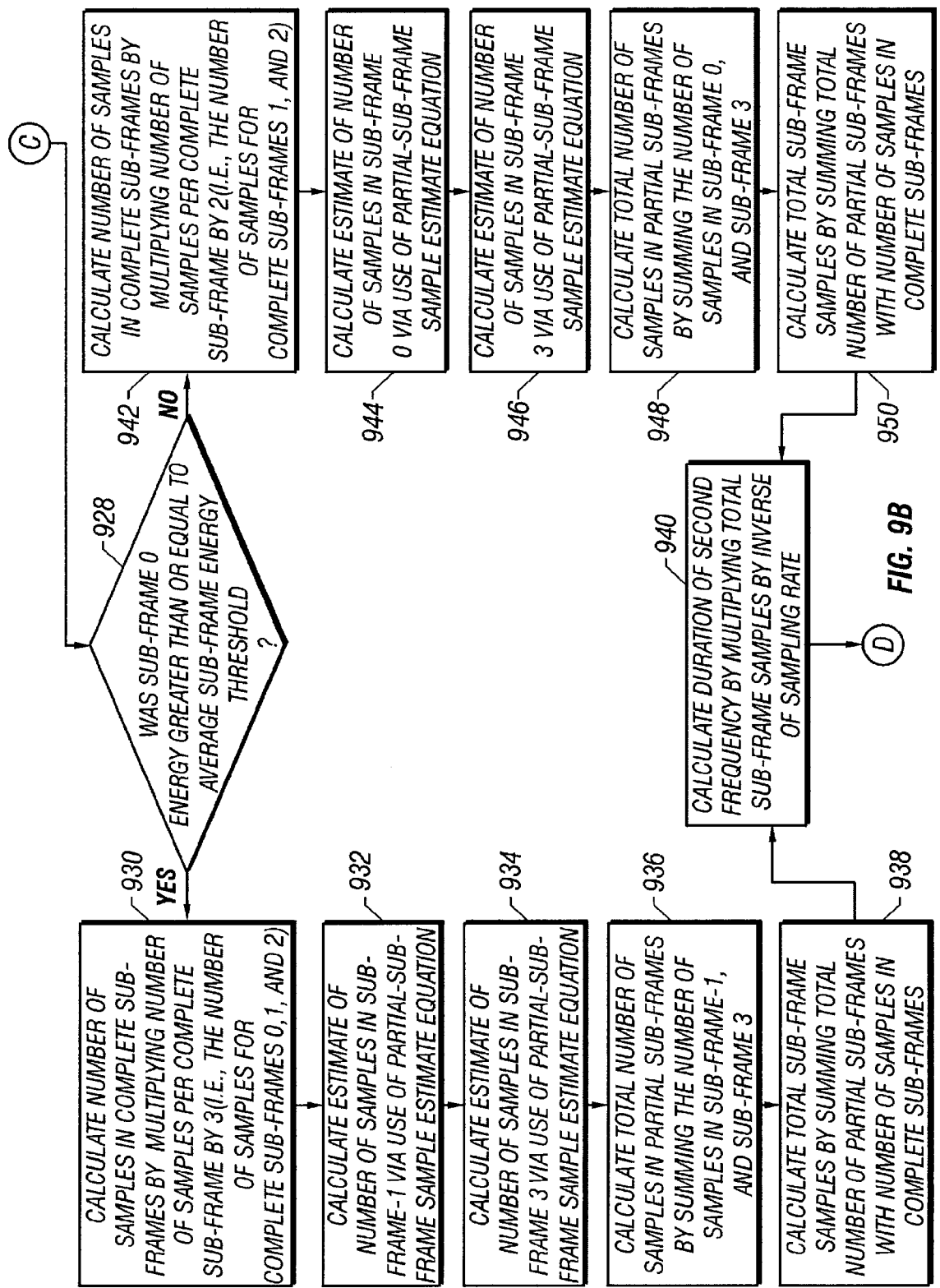

METHOD AND SYSTEM FOR IMPROVED DETECTION OF ANALOG SIGNALS

BACKGROUND OF THE INVENTION

1. Field of the Invention

The present invention relates to analog communication systems. In particular, the present invention relates to analog communication systems, such as telephony systems, wherein analog control signals are sent in voice band.

2. Description of the Related Art

An analog communication system is a communication system wherein information is transmitted as a continuous-time signal. One such analog communication system is an analog telephony system.

Within analog telephony systems, it is necessary for communication system control information to be transmitted between communications devices. Such information can be used to control switching, to alert a telephone user that he or she has a call waiting, or to display caller identification information. One way in which such control information is transmitted within telephony systems is referred to as "in-band signaling."

In an analog telephony system, analog electrical signals utilized within the telephony system are directly translated to mechanical signals of identical frequencies by use of a transducer such as a telephone speaker. The mechanical signals from the speaker are perceived as sound "tones" by a human telephone user. The electrical signal frequencies which directly translate to mechanical signals (tones) which humans can hear are referred to as "voice band" frequencies, since what a human usually hears over a telephone is the human voice.

When control information signals are sent in the range of electrical frequencies which will translate to tones humans can hear, such signaling is referred to as "voice-band" or "in-band signaling." One specific scheme in which this is currently done is known as Dual Tone Multi-Frequency (DTMF) signaling. "Dual Tone" implies that any two frequencies used will be in-band, Multi-Frequency implies that more than one frequency per tone is possible.

A problem which commonly occurs when in-band signaling tones, single or multiple, are used to transmit information, is the accurate estimation of the time duration for which the signal is present. For example, in DTMF tones used in standard telephony applications for push-button signal reception, signal durations in the range 20–40 ms are specified as the minimum-to-maximum requirement in various National and International Standards. Outside this range, the signal can be accepted or rejected as a true signaling tone, depending upon the accuracy of measurement specified by a particular Communications Administration.

The current trend is for more and more information to be conveyed via DTMF signals. A relatively recent example of such increase in information to be conveyed via tone detection is the group of services known as Caller Identity Deliver on Call Waiting (CIDCW) which provides caller identity information to the subscriber for calls that are call waited.

As more and more information is conveyed via DTMF signals, the allowable signal tolerances are dropping. That is, system performance requirements are rising. One example of such rising performance requirements is set forth in Bellcore Special Report SR-TSV-002476, Issue Dec. 1, 1992, which sets forth a series of six very stringent performance criteria, all of which must be passed for DTMF systems to be deemed "Bellcore Standard Compliant."

One set of "Bellcore Standard Compliant" performance criteria relates to tone detection. A Bellcore Compliant system must be able to detect tones within a very narrow frequency tolerance, and a tightly controlled time window. For example, for the two DTMF tones 2130 Hz and 2750 Hz, the Bellcore performance criteria are as follows: Lower Tone: 2130 Hz+/–0.5%; Upper Tone: 2750 Hz+/–0.5%; Dynamic Range: –14 to –32 dBm per tone; Power Differential within Dynamic range: 0 to 6 dB between tones. The specified duration for the DTMF signal to be accepted as a control signal by Customer Premises Equipment must fall within a time window 75 to 85 ms duration.

The current generation of DTMF detectors cannot meet such foregoing noted required levels of accuracy in a cost-effective manner. Current DTMF detectors tend to bandpass filter the analog signals at the specified frequencies, and then ensure that such frequencies exceed a preset threshold. Due to the analog nature of such systems, there generally needs to be one specific analog filter for each tone. Furthermore, such analog filters tend to drift and are very difficult to keep within Bellcore compliances. Also, filters which have sharp enough cutoffs to meet the +/–0.5% frequency tolerance are typically expensive to build and maintain. Furthermore, this difficulty in filter sharpness translates into difficulty in telling when the frequency started and stopped, which makes it difficult to meet the stringent Bellcore 75–85 msec window.

It is therefore apparent that a need exists for a method and system which will efficiently and cost-effectively allow the accurate detection and measurement of analog signals, where such signals are composed of one or more analog frequencies of defined duration, and where such signals must have, for each frequency composing the signal, the power associated with that frequency concentrated within a very narrow bandwidth and the time of duration of that frequency contained within a very narrow time window.

SUMMARY OF INVENTION

It has been discovered that a method and system can be produced which will efficiently and cost-effectively allow the accurate detection and measurement of analog signals, where such signals are composed of one or more analog frequencies of defined duration, and where such signals must have, for each frequency composing the signal, the power associated with that frequency concentrated within a very narrow bandwidth and the time of duration of that frequency contained within a very narrow time window. In the method and system, an analog signal is received. A stream of data samples is created from the received analog signal. Based on the stream of data samples, a duration is calculated for one or more analog frequencies contained within the received analog signal. The duration is calculated for the one or more frequencies by utilizing a calculated signal energy for each of the one or more analog frequencies. The calculated signal energies for each of the one or more analog frequencies are used to determine a number of frequency-specific data samples. The number of frequency-specific data samples are then utilized with a sampling rate to calculate the duration of the each of the one or more analog frequencies. The one or more calculated durations of each of the one or more analog frequencies are utilized to determine whether the analog signal, composed of the one or more analog frequencies of defined duration, is present.

The foregoing summary is illustrative and is intended to be in no way limiting. Other aspects, inventive features, and advantages of the present invention as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIGS. 9A and 9B constitute a high-level logic flowchart which illustrates how an embodiment of a 2750 Hz (second) frequency duration measurement unit determines which sub-frames to utilize to calculate the duration of the 2750 Hz (second) frequency, and how such duration is calculated.

The use of the same reference symbols in different drawings indicates similar or identical items.

DESCRIPTION OF THE PREFERRED EMBODIMENTS

The following sets forth a detailed description of the best contemplated mode for carrying out the invention as described in the claims. The detailed description is intended to be illustrative and should not be taken as limiting.

Figure 1:
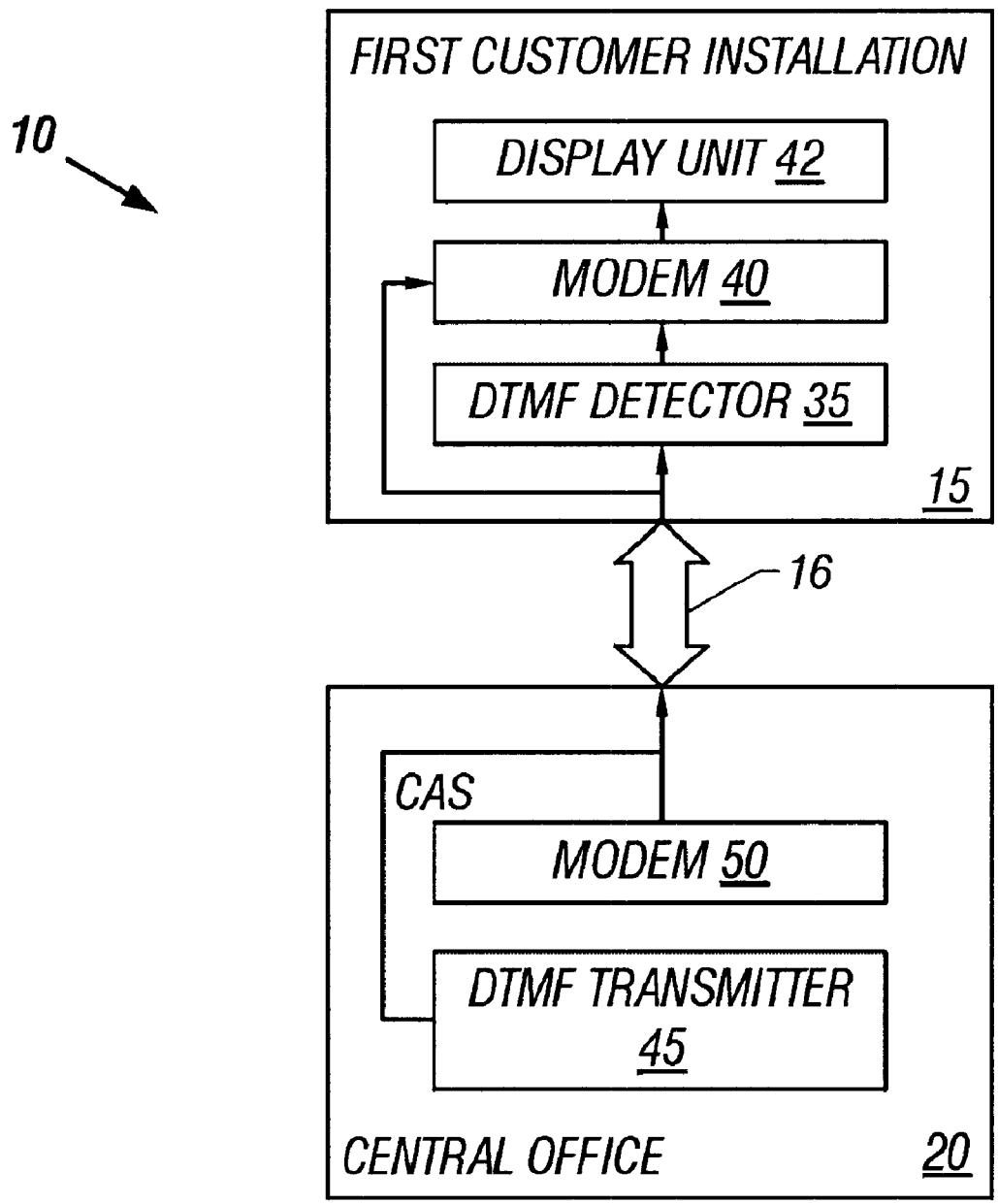
FIG. 1 depicts an environment wherein one embodiment of the present invention may be practiced.

With reference to the figures and in particular with reference now to FIG. 1, there is depicted an environment wherein one embodiment of the present invention may be practiced. Shown is a public switched telephone environment 10, consisting of central office 20 and first customer installation 15 connected by analog link 16. Depicted within central office 20 are Dual Tone Multi-Frequency (DTMF) Transmitter 45 and modem 50. Illustrated within first customer installation 15 are DTMF detector 35, modem 40, and display unit 42.

Illustrated is that DTMF transmitter 45 produces a dual tone Customer Premises Equipment Alerting Signal (CAS) and transmits that signal in voice band, along with any other information also being transmitted by modem 50, over analog link 16. Upon receipt of this analog signal, DTMF detector 35 detects and responds to any DTMF signal that might be present within the analog data received over analog link 16. Thereafter, the control information in any such received DTMF signal is either used to control various customer premises equipment, such as modem 40, or display certain information on display unit 42 (such as caller identification information) while the analog signal received over analog link 16 is passed on to modem 50.

Figure 2:
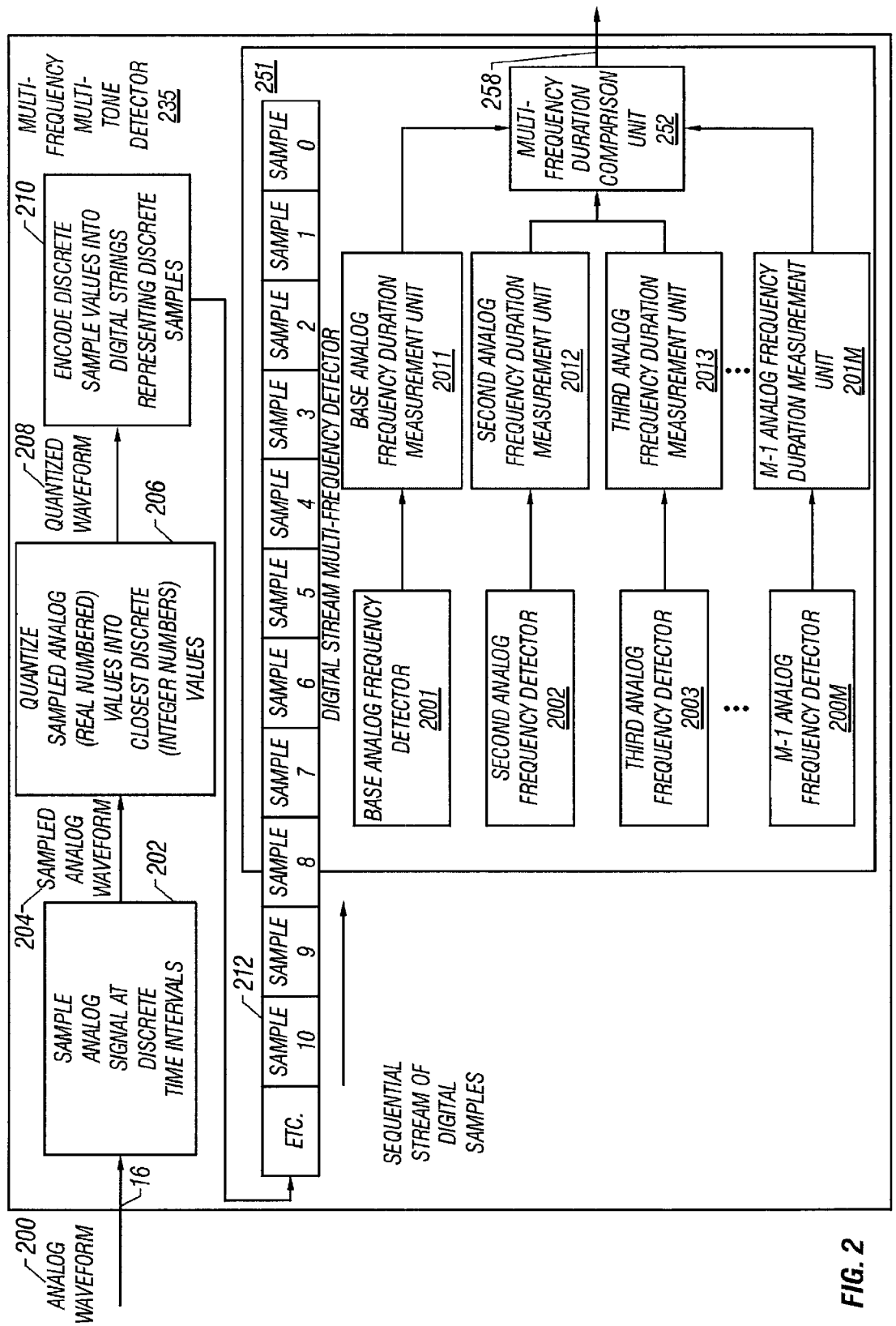
FIG. 2 is a high-level block diagram showing an embodiment of the present invention which can be practiced in the environment of FIG. 1.

Referring now to FIG. 2, which is a high-level block diagram showing an embodiment of the present invention which can be practiced within the environment of FIG. 1, shown is that Multi Tone Multi-Frequency detector 235 (which is similar to DTMF 35, but which can detect one or more tones as necessary rather than just two tones) receives analog waveform 200 via analog link 16 (although the term "tone" refers to tone signals within human audal perception, it is to be understood that signals in other frequency bands can also be detected). Depicted is that analog waveform 200 is sampled at discrete time intervals by conventional sampling device 202. Illustrated is that the result of the sampling by conventional sampling device 202 is real-valued sampled analog waveform 204. Shown is that real-valued sampled analog waveform 204 then enters conventional quantization unit 206 wherein the real-valued samples of real valued sampled analog waveform 204 are converted into their nearest integer-valued equivalents, which results in quantized waveform 208.

Depicted is that quantized waveform 208 then enters conventional encoding unit 210, wherein each sequential integer value of quantized waveform 208 is converted into a digital sample string (typically consisting of 8–16 bits), which results in a stream of digital samples 212.

Depicted is that stream of digital samples 212 enters multi-frequency detector 251. Shown is that when "M" (the number of frequencies to be detected) multiple frequencies are to be detected, multi-frequency detector 251 contains a base analog frequency detector plus an additional M-1 analog frequency detectors 2001–200M. Each analog frequency detector 2001–200M within multi tone detector 251 detects one or more analog frequencies within analog waveform 200, on the basis of stream of digital data samples 212, and outputs detection information to analog frequency duration units 2011–201M. Analog frequency duration measurement units 2011–201M output the duration of the detected analog signals to multi-frequency duration comparison unit 252, which produces output signal 258, which is indicative of one or more multiple frequencies detected.

Figure 3:
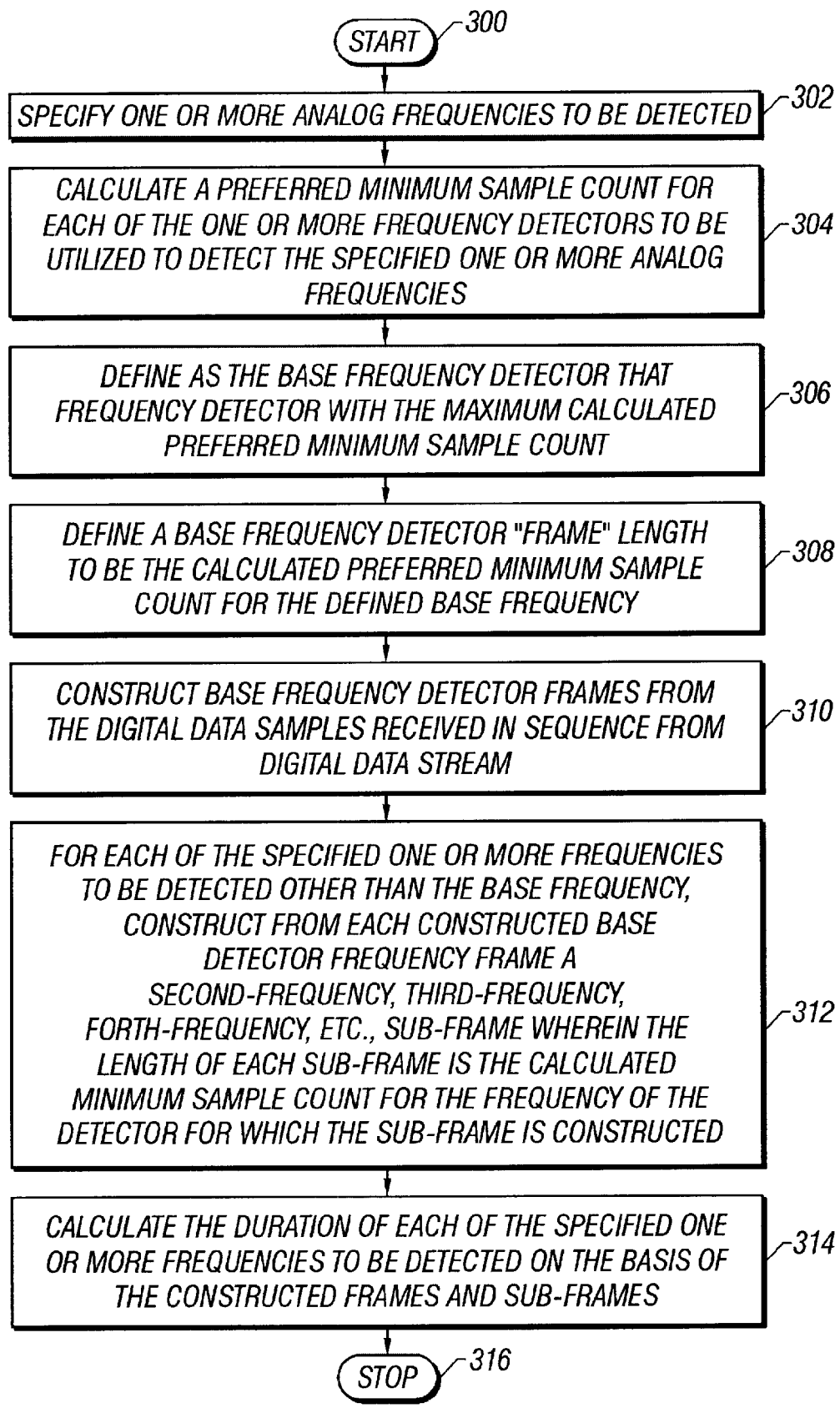
FIG. 3 a high-level logic flowchart depicting a process whereby one embodiment of the present invention detects multiple frequencies.

With reference now to FIG. 3, which is a high-level logic flowchart depicting a process whereby one embodiment detects multiple frequencies, method step 300 illustrates the start of the process. Method step 302 shows the specification of one or more (i.e., "M") analog frequencies to be detected. Method step 304 shows the calculation of a preferred minimum digital sample count for each of the frequency detectors 2001–200M (M being a positive integer) used to detect the specified one or more analog frequencies that are to be detected.

Method step 306 shows the definition of a base frequency detector, where the base frequency detector is defined to be the detector whose calculated preferred minimum digital sample count of method step 304 had the greatest length (e.g., if the calculated preferred minimum sample count for a frequency detector for X Hz were, for example, 10, and if the calculated preferred minimum sample count for a frequency detector for Y Hz were, for example, 20, frequency Y would be declared as the base frequency, and the detector for frequency Y Hz would be declared the base frequency detector). Method step 308 shows that a "frame" length (as used herein, the term "frame" refers to a defined number of a sequence of digital samples appearing within digital sample stream 212, and does not necessarily imply the use of framing data, such as frame start symbols and frame end symbols) for the base frequency detector is defined to be the calculated preferred minimum sample count for that base frequency detector (e.g., for frequency Y Hz, the base frequency, the base frequency detector "frame" length would be defined to be 20 samples.

Method step 310 illustrates the construction of base frequency detector frames from the digital data samples sequentially received via digital data stream 212. It is to be understood that since "frame" merely means a specified sequence of digital samples, the "construction" of frames, as used herein, could mean either that each received digital sample is processed individually up to the defined frame length (as in a specific embodiment described below), or that the entire frame is received and then processed.

Method step 312 shows the construction of sub-frames from each constructed base frequency detector frame. For each of the specified one or more frequencies to be detected other than the frequency defined to be the base frequency, there will be one sub-frame detector. The lengths of the sub-frames constructed will be the preferred minimum sample count for the frequency of the detector for which the sub-frame is created.

Method step 314 depicts that the analog frequency detectors 2001–200M in conjunction with the analog frequency duration measurement units 2011–201M will then utilize the constructed frames and sub-frames to detect and calculate the duration of the specified one or more frequencies that are to be detected. Method step 316 illustrates the end of the process.

Figure 4:
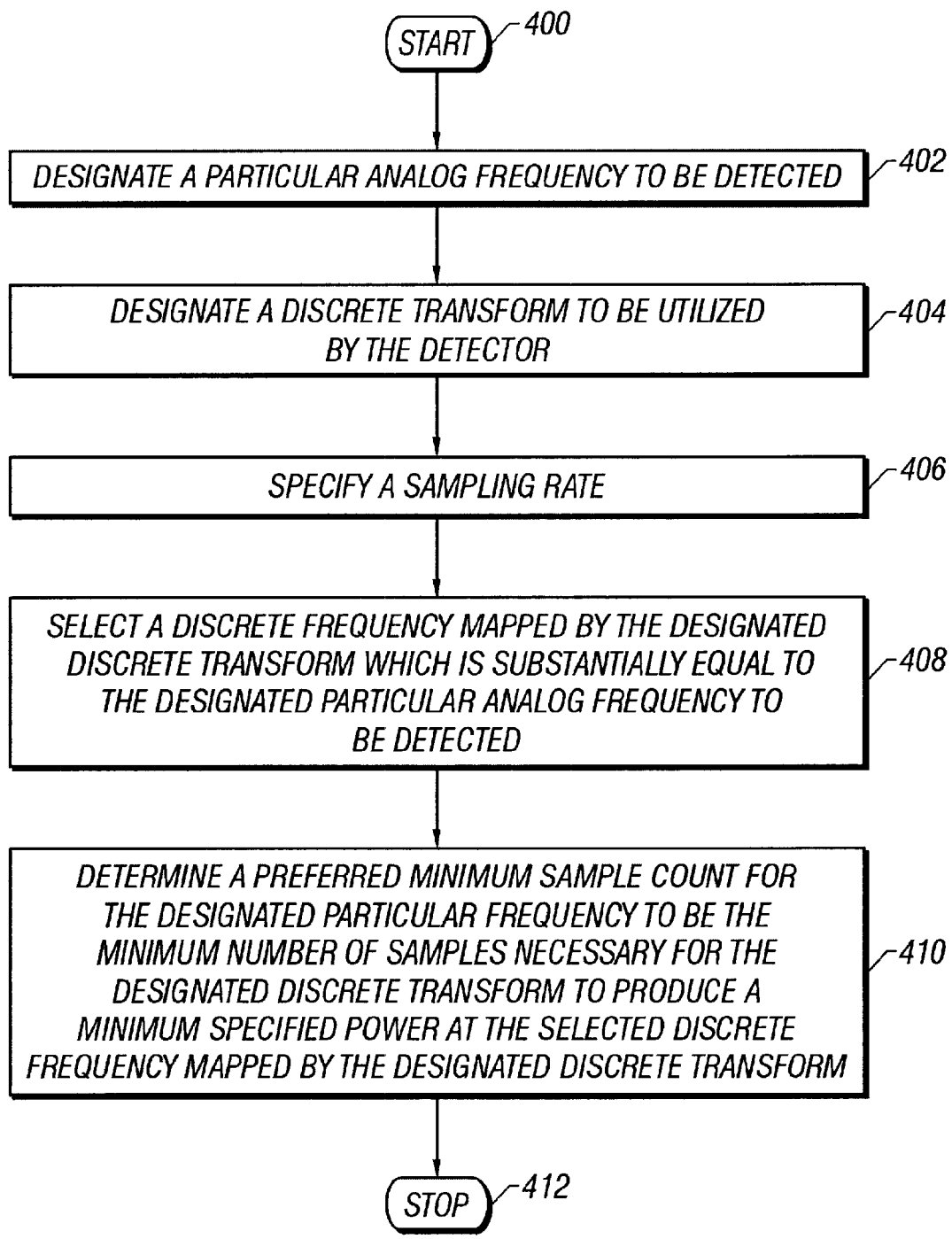
FIG. 4 is a high-level logic flowchart illustrating how one embodiment determines preferred minimum sample counts for a particular frequency detector.

Referring now to FIG. 4, which is a high-level logic flowchart illustrating how one embodiment determines preferred minimum sample counts for a particular frequency detector, method step 400 shows the start of the process. Method step 402 illustrates the designation of a particular analog frequency to be detected. Method step 404 depicts the designation of a discrete transform to be utilized by a detector in order to determine the preferred minimum sample counts. In the dual-frequency embodiment, described below, the designated discrete transform is the Discrete Fourier Transform as expressed by the Goertzel algorithm, but those skilled in the art will recognize that other discrete transforms can be substituted. Method step 406 illustrates that a sampling device 204 rate is specified.

Those skilled in the art will recognize that discrete transforms map signal energy to discrete frequencies, which may not always equate to the analog frequency to be detected. Those skilled in the art will also recognize that the accuracy of the discrete transform in mapping the energy at a particular discrete frequency goes up as the number of samples examined increases. Consequently, it is necessary both to choose a discrete frequency mapped by the designated discrete transform, which most closely approximates the desired analog frequency, and to choose a preferred minimum sample count which will give a sufficient output energy at the chosen discrete frequency within defined bandwidth tolerances.

Method step 408 shows the selection of a discrete frequency mapped by the designated discrete transform which is substantially equal to the designated particular analog frequency to be detected. In the dual tone embodiment described below, the discrete frequency deemed substantially equal to the designated analog frequency is that which gives the smallest absolute error. Those skilled in the art will recognize that other selection criteria are possible.

Method step 410 depicts the empirical determination of the preferred minimum sample count to be that number of samples necessary to get a required power at the chosen frequency to exist within some minimum bandwidth specified by the system designer and dictated by the actual hardware, software, or firmware whereby the present invention is illustrated. Method step 412 depicts the end of the process.

For sake of clarity and ease of understanding, the operation of multi tone multi-frequency detector 251 will be explained via reference to an embodiment analogous to a dual tone multi-frequency detector (i.e., a multi tone multi-frequency detector where M, the number of frequencies to be detected, is 2), which has been set to detect two specific frequencies. However, it is to be understood that the dual tone multi-frequency example is intended to be merely illustrative, and not limiting, in that it is envisioned that the present invention will detect more than two frequencies via straightforward extensions of the method and system demonstrated in the context of the dual tone multi-frequency detector embodiment. That is, the present invention has a particularly useful dual tone-multi-frequency detector embodiment, but its embodiments include the ability to detect far more than just two tones or frequencies.

Figure 5A:
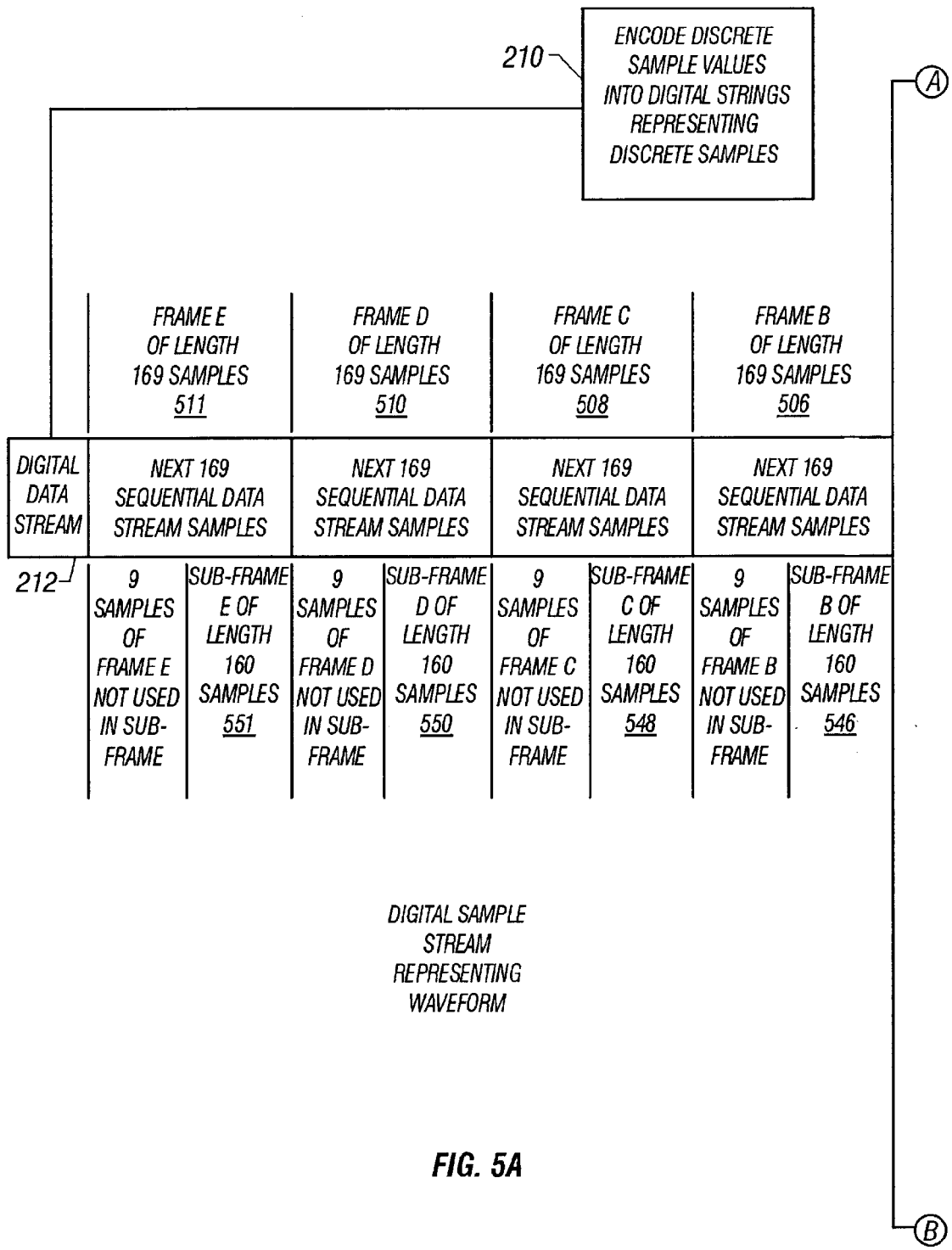
FIG. 5 is a high-level partially schematic diagram showing a dual tone multi-frequency embodiment of the present invention.
Figure 5B:
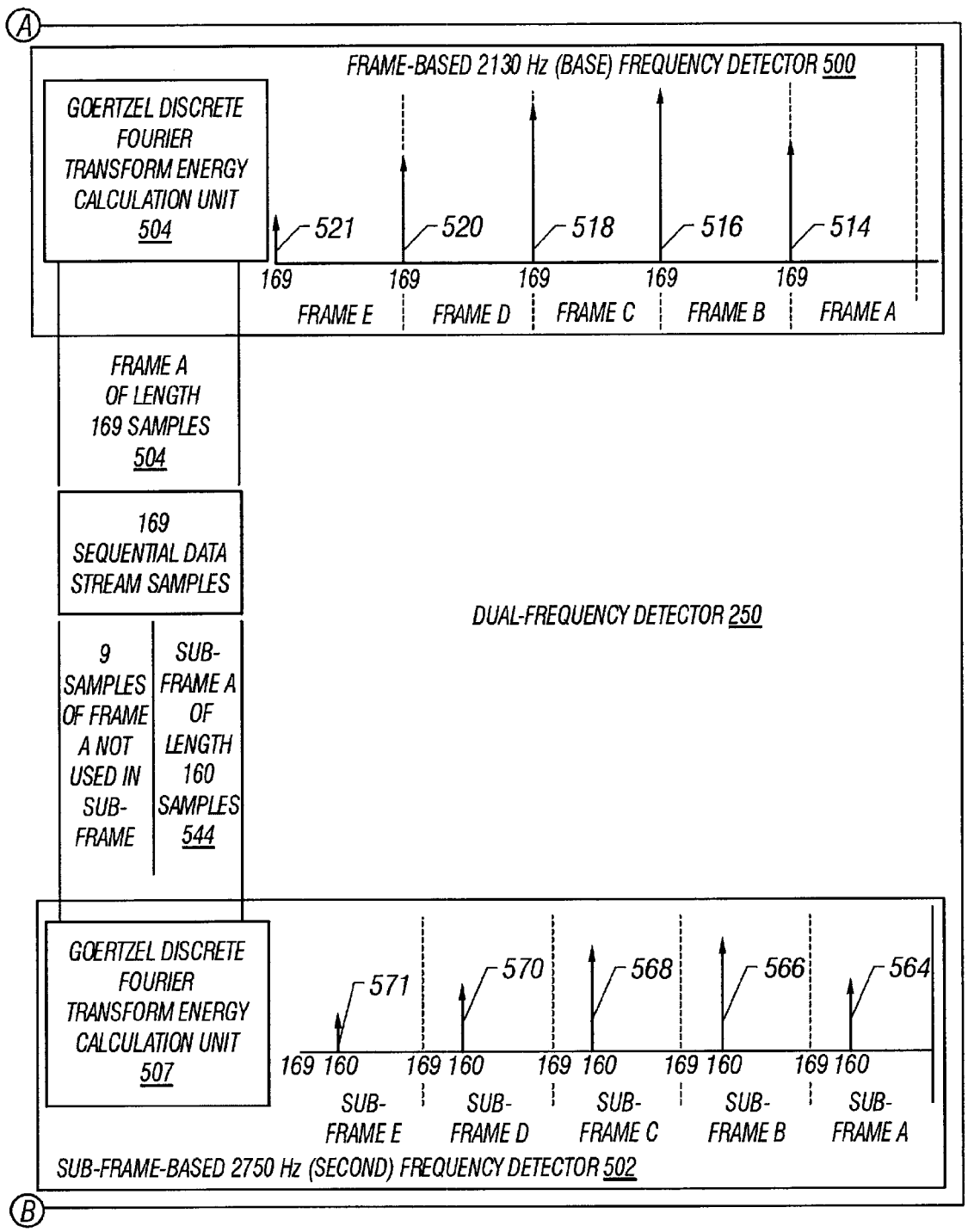

Referring now to FIG. 5, there is depicted a high-level partially schematic diagram showing a dual tone multi-frequency embodiment of the present invention described in the context of two specified frequencies: 2130 Hz (the base frequency, for reasons described below) and 2750 Hz (the second frequency, for reasons described below) frequencies. Shown in FIG. 5 is that the stream of digital samples 212 from encoding device 210 is accepted by dual-frequency detector 250. Although for sake of clarity stream of digital data 212 is shown in FIG. 5 as being segmented into frames prior to entering dual-frequency detector 250, it is to be understood that in actuality digital sample stream 212 enters dual-frequency detector 250 as a stream, after which digital sample stream 212 is partitioned into frames and sub-frame size blocks. Shown is that contained within dual tone detector 250 are frame-based 2130 Hz detector 500 and sub-frame-based 2750 Hz detector 502, operating substantially in parallel.

As will be shown below, the 2130 Hz signal has the greatest preferred minimum sample count, so it has been designated the base signal and has been used to define the base frequency detector frame length. Accordingly, shown is that frame-based 2130 detector 500 will accept digital data stream 212 as frames constructed from 169 samples (e.g., Frame A 504, Frame B 506, Frame C 508, Frame D 510, and Frame E 511, all of length 169 data samples). As will also be shown below, the 2750 Hz signal has a preferred minimum sample count of 160, and thus shown is that sub-frame-based 2750 Hz detector 502 will accept sub-frames of length 160 samples, where such sub-frames are constructed from the frames of data constructed for frame-based 2130 Hz (base) frequency detector (e.g., sub-frame A 544 of length 160 data samples is shown as constructed from frame A 504, sub-frame B 546 of length 160 data samples is shown as constructed from frame B 506, sub-frame C 548 of length 160 data samples is shown as constructed from frame C 508, sub-frame D 550 of length 160 data samples is shown as constructed from frame D 510, and sub-frame 551 of length 160 date samples is shown as constructed from frame E 511).

Depicted is Goertzel Discrete Fourier Transform Energy Calculation Unit 509 which is shown as accepting the 169 samples of data (or a frame of data), and outputting an energy signal contained within the frame subsequent to the receipt of that frame. Shown graphically are frame A energy 514, frame B energy 516, frame C energy 518, frame D energy 520, and frame E energy 521 associated with frame A 504, frame B 506, frame C 508, frame D 510, and frame E 511, respectively.

Depicted also is Goertzel Discrete Fourier Transform Energy Calculation Unit 507 which is shown as accepting sub-frames of 160 samples of data constructed from the frames of data constructed for/by frame-based 2130 Hz detector 500, and outputting an energy signal contained within the sub-frame subsequent to the receipt of that sub-frame. Shown graphically are sub-frame A energy 564, sub-frame B energy 566, sub-frame C energy 568, frame D energy 570, and sub-frame E energy 571 associated with sub-frame A 544, sub-frame B 546, sub-frame C 548, sub-frame D 550, and sub-frame E 551, respectively. Shown is that Goertzel Discrete Fourier Transform energy calculation unit 507 outputs the sub-frame energies slightly before Goertzel Discrete Fourier Transform energy calculation unit 509. The reason for this is that the sub-frame energies are computed on 160 samples out of each 169 sample frame, and the last 9 samples in the frame are not computed, in contrast to the frame energies which are computed on the full 169 samples in each frame.

As has been discussed, the embodiment of FIG. 5 is representative of a specific dual-frequency embodiment which detects a CAS signal composed of two tones of specified frequency and duration. By way of example, the specified frequencies and duration of the CAS signal tones were defined as follows: Lower Tone: 2130 Hz+/−0.5%; Upper Tone: 2750 Hz+/−0.5%; Dynamic Range: −14 to −32 dBm per tone; Power Differential within Dynamic range: 0 to 6 dB between tones. The specified duration for the CAS at Customer Premises Equipment duration is 75 to 85 ms.

The foregoing noted signaling tolerances and duration were chosen in conformance to Bellcore Special Report SR-TSV-002476, Issue Dec. 1, 1992, Appendix A, which is herein incorporated by reference in its entirety.

As has been indicated, the dual tone embodiment of FIG. 5 utilizes a variant of the Discrete Fourier Transform (DFT), the Goertzel algorithm, to calculate preferred minimum sample counts which are thereafter utilized to define frame and sub-frame lengths ultimately utilized to detect the dual-frequency signals. Accordingly, following is a general description of the Goertzel algorithm and how it is used to calculate preferred minimum sample counts in one embodiment of the present invention. For a more detailed description of this algorithm see "Introduction To Digital Signal Processing", J. G. Proakis, D. G. Manolaxis, MacMillan Publishing, which is hereby incorporated by reference.

Essentially, the Goertzel algorithm is a second-order recursive computation of the DFT using both a feedback and a feedforward phase. The feedback phase computes a new output y(n+1) for every new input sample x(n) where N is number of input samples. The feedback equation is:

$$y(n+1)=c*y(n)-y(n-1)+x(n) \quad \text{Equation (1)}$$

where c is the Goertzel coefficient
c=2*cos (2*pi*f/F) where f is the frequency to be detected
and F is the sampling frequency The feedforward phase is normally only calculated when n=N generating a single output energy parameter using, after some algebraic manipulation, the equation:

$$|Yk(N)|^2=y(n)*y(n)+y(n-1)*y(n-1)-2*c*y(n)*y(n-1) \quad \text{Equation (2)}$$

where c=cos(2*pi*k/N)=cos(2*pi*f/F)
and avoids using complex arithmetic.

The Goertzel algorithm was used to calculate the preferred minimum sample counts for the two different defined frequencies in the dual-frequency embodiment of FIG. 5. In the following discussion, the preferred minimum sample counts are referred to as "N" As has been discussed above, in order to define the preferred minimum number of sample counts for each frequency, it is necessary to determine a discrete frequency closely corresponding to each specified analog frequency which is to be detected. In the following discussion, a discrete frequency is specified via reference to both N and the letter "k": N and k are formulaically related to the discrete frequency, dependent upon system sampling rate, in a manner set forth in equation (4) below. The context of the following discussion indicates with which frequency a particular letter N (preferred minimum sample length) or a particular letter k (a parameter correspondent to a specific discrete frequency substantially equal to the analog frequency to be detected) is to be associated.

Determining N and k for a given frequency requires a trade-off between accuracy and speed of detection of a desired discrete frequency. Accuracy and speed of detection are dependent upon N: if N is large, resolution in the frequency domain is good, but the time to generate the output from the feedforward phase of the Goertzel algorithm increases. This is because N samples must be processed in the feedback phase before the output from the feedforward phase can be calculated. That is, in the Goertzel algorithm all N samples must be calculated before a final energy can be calculated.

The spacing of the energy output values in the frequency domain from feedforward phase is equal to half the sampling frequency divided by N. Therefore, if some tone is present in the input signal which does not fall exactly on one of these frequency points, the energy of this frequency component appears mostly in the closest frequency point but partly in the other frequency points—a phenomenon known as leakage. Thus, in order to avoid leakage, it is desirable for the tones requiring detection to be centered exactly on a frequency point. These discrete frequency points are referred to by the k value in the equation (2) above. This value is an integer value lying in the range 0,1, . . . , N−1 where the actual frequency to which k corresponds depends on the sampling frequency F and N using the following formula:

$$\frac{f(\text{tone})}{F(\text{sampling})} = \frac{k}{N} \quad \text{Equation (3)}$$

$$\text{Therefore } k = \frac{N}{F(\text{sampling})} * f(\text{tone}) \quad \text{Equation (4)}$$

where f(tone) is the frequency to be detected and k is an integer.

The sampling frequency F used in a telephone network is typically 8 kHz, which will be used here as the specified sampling rate, leaving only the variable N that can be modified. Since the k values must be integers, the corresponding frequency points may not be exactly aligned with the tones required to be detected. The k values will therefore have a corresponding absolute error e (k) associated with them defined as the difference between the real number k and the closest integer to this real value. This is shown below:

$$\text{absolute error } e(k) = \left| \frac{N * f(\text{tone})}{F(\text{sampling})} - \text{closest integer} \frac{N * f(\text{tone})}{F(\text{sampling})} \right| \quad \text{Equation (5)}$$

Using Equation (5) above, the values of N best suited to the CAS tones of 2130 and 2750 Hz were determined as follows:

Since the defined CAS tone duration is 75–85 ms which is equivalent to 600–680 samples at the 8 kHz sampling frequency, a frame detection length of approximately 150–170 samples would allow the detection algorithm to perform detection on 4 consecutive frames of the tones present in the input signal (the number of consecutive frames to utilize is a choice within the purview of the system designer, so long as N is of sufficient magnitude to allow the detector to detect signals with the prescribed bandwidth— e.g., +/−0.5% of frequency to be detected.). Using this range of 150–170 samples, an analysis resulted in the values shown below in Table 1 being chosen for the two CAS tones:

TABLE 1

| f (tone) | N value | k value (float) | k value (integer) | absolute error e (k) | co-efficient |
|---|---|---|---|---|---|
| 2130.0 | 169 | 44.99625 | 45 | 0.00375 | — |
| 0.204126297 | | | | | |
| 2750.0 | 160 | 55.0 | 55 | 0.00 | — |
| 1.111140466 | | | | | |

Since the 2750 Hz tone uses less samples to calculate the final frame energy, a normalization of this final energy value is required so that energy comparisons for the 2130 and the 2750 Hz tone are meaningful. This is achieved by multiplying the final 2750 frame energy by the factor:

$(169/160)^2 = 1.115664063$

As shown, the preferred minimum sample count for the specified 2130 Hz frequency is 169 samples, and the preferred minimum sample count for the 2750 Hz frequency is 160 samples. Consequently, since the 2130 Hz is has the greatest preferred minimum sample count, the base detector frequency was shown in FIG. 5 as 2130 Hz, and the base detector frame length was shown as 169 samples. Likewise, the second frequency was shown in FIG. 5 as 2750 Hz, and the second frequency sub-frame length was shown as 160 samples.

Exactly how the dual-frequency embodiment (and by straightforward extension, how the multi tone multi-frequency embodiment) utilizes the frames and sub-frame lengths will be described shortly.

Figure 6:
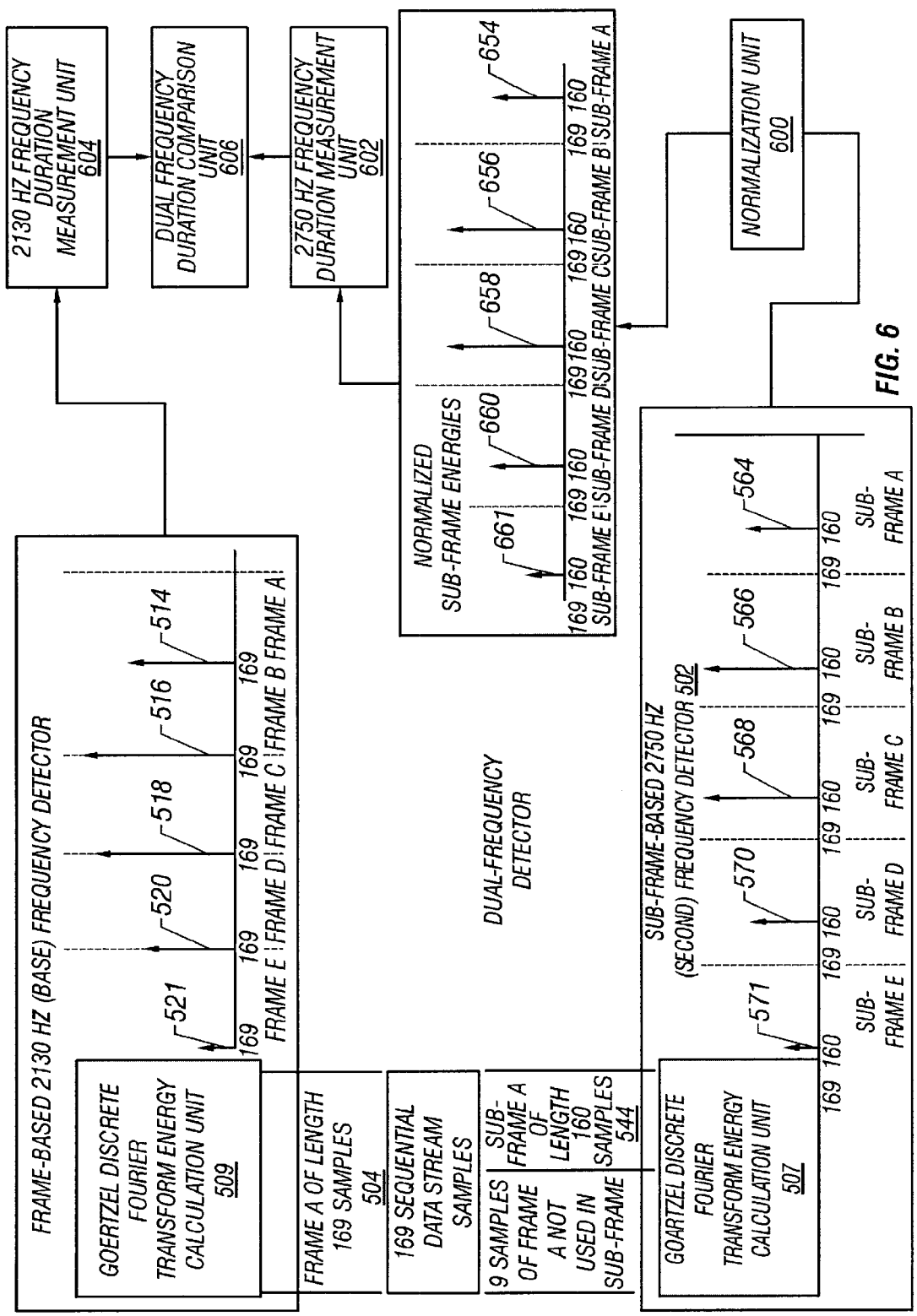
FIG. 6 is a high-level partially schematic diagram illustrating an embodiment of the present invention wherein a normalization factor is utilized.

With reference now to FIG. 6, which is a high-level partially schematic diagram illustrating an embodiment utilizing the normalization factor discussed above, shown are that sub-frame energies 564–571 are subsequently subjected to normalization within normalization unit 600. Depicted is that normalization unit 600 adjusts the sub-frame energies 564–571 by multiplying each by the above referenced normalization factor. The normalization factor, as discussed above, is equal to the frame length divided by the sub-frame length, squared, or $(169/160)^2$. Shown are normalized sub-frame energies 654, 656, 658, 660 and 661.

Illustrated is that the output of normalization unit 600 (the normalized sub-frame energies 654, 656, 658, 660 and 661) is delivered to 2750 Hz frequency duration measurement unit 602. 2750 Hz frequency duration measurement unit 602 utilizes the energies to calculate the duration of any 2750 Hz tone received. Further illustrated graphically is the output of Goertzel Discrete Fourier Transform energy calculation unit 509 (the frame energies 514, 516, 518, 520 and 521) is delivered to 2130 Hz frequency duration measurement unit 604. 2130 Hz frequency duration measurement unit 604 utilizes the energies to calculate the duration of any 2130 Hz tone received. Thereafter, both 2750 Hz frequency duration measurement unit 602 and 2130 Hz frequency duration measurement unit 604 output the duration of their respective frequencies to dual-frequency duration comparison unit 606 (a dual frequency embodiment of multi-frequency duration comparison unit 252) which determines if the two frequencies have been received within tolerances.

It was explained above that, given a chosen system sampling rate, a "free choice" is available to the system designer regarding the number of "frames" which will be utilized to detect a frequency of defined duration (in the above-referenced example, the number of frames was chosen as 4, dependent upon the system sampling rate). That is, given the system sampling rate and the range of time duration during which the signal is to be detected, the system designer can define the range of the number of samples necessary to detect a designated frequency for a designated time, which a system designer can then break into a number of designated frames with a given range of sample lengths (e.g., a tone duration of 75–85 ms equivalent to 600–800 samples at 8 kHz sampling frequency, was broken into 4 frames given a range of 150–170 sample length), such range then being utilized to determine the sample length for the frames and sub-frames, as described above.

Figure 7:
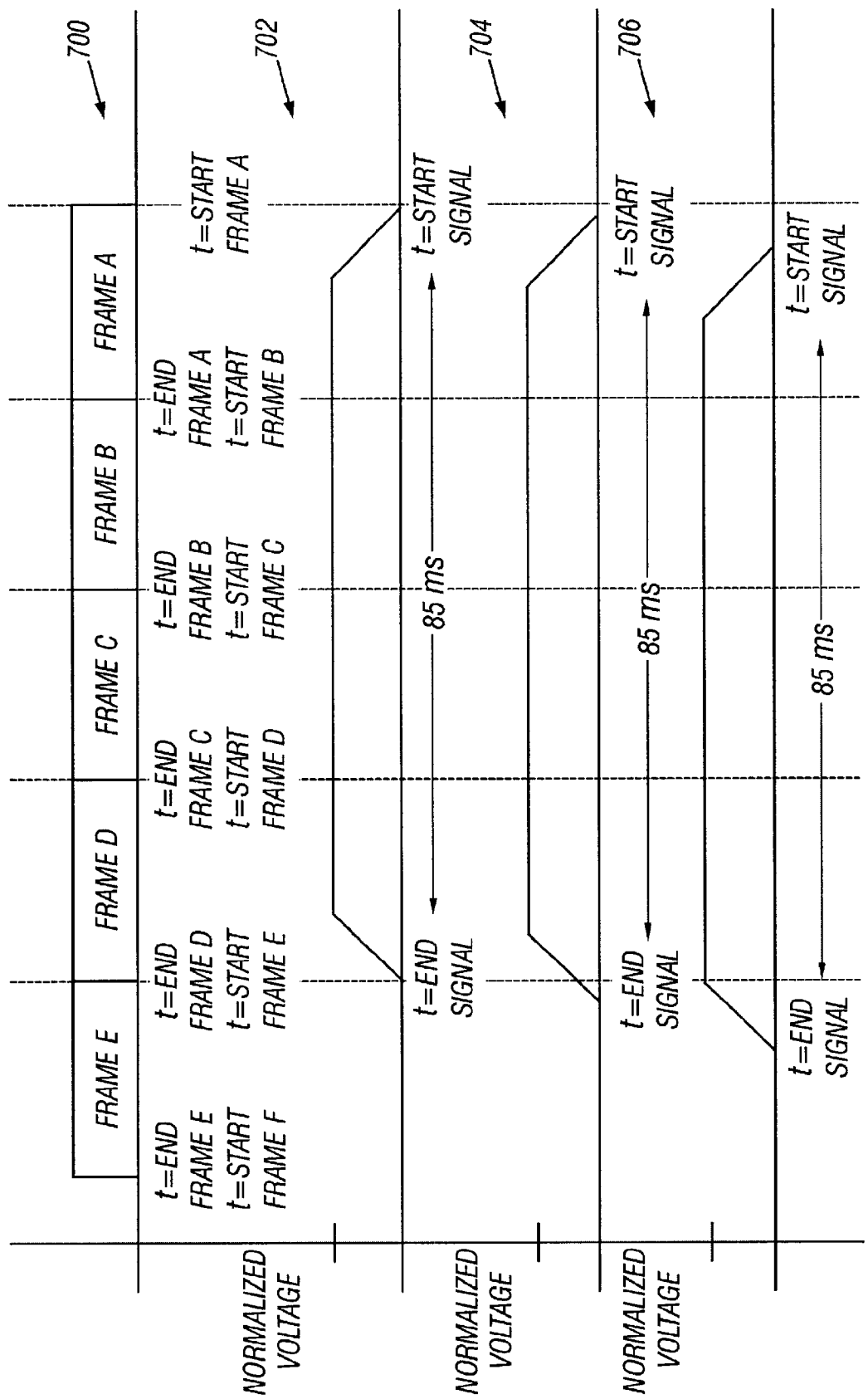
FIG. 7 is a pictographic representation illustrating how a specific frequency signal coordinates with the frame lengths.

Referring now to FIG. 7, which is a pictographic representation illustrating how a specific frequency signal coordinates with the frame lengths previously discussed for the 2130 Hz (base) frequency signal, shown is an illustrative diagram 700 wherein are depicted 5 frames (frame A, frame B, frame C, frame D, and frame E) of digital sample stream 212 data. Further shown are three illustrative diagrams 702, 704, 706 depicting the presence (denoted by a value of 1) or absence (denoted by a value of 0) of a normalized voltage of an analog signal at 2130 Hz signal for a duration 85 ms. In the event that the time interval of the 2130 Hz signal for a duration 85 ms exactly matches the start and stop boundaries of four consecutive frames, as shown in diagram 702, this maximum duration signal can be detected by the use of 4 frames. However, in the event that the time interval of the 2130 Hz signal for a duration 85 ms does not exactly match the start and stop boundaries of four consecutive frames, as shown in diagrams 704 and 706, this maximum duration signal will be spread over 5 frames, and thus 5 frames are necessary to detect the duration of the signal. An analogous situation exists with respect to the detection of signals utilizing sub-frames.

The fact that the signal energy can be spread over 4 or 5 frames (or sub-frames) is utilized in the discussed embodiment utilizing Frame-Based 2130 Hz Frequency Duration Measurement Unit 604 and sub-frame Based 2130 Hz Frequency Duration Measurement Unit 602 to detect the duration of the frequencies in a manner which will now be illustrated. However, while the embodiments are being discussed in relation to specific frequencies of defined specific duration being utilized in a specific number of frames, those skilled in the art will recognize that such embodiments are illustrative and limiting, in that the basic method illustrated by specific example can be adapted to other defined frequencies of other defined duration to be detected utilizing other system designer chosen numbers of base frames.

One embodiment of the present invention detects a defined base frequency by classifying frames as full or partial depending upon the calculated energy of such frames, after which such classified frames are utilized to calculate the duration of the signal. A similar process is utilized for other defined frequencies using the same method for subframes.

Figure 8A:
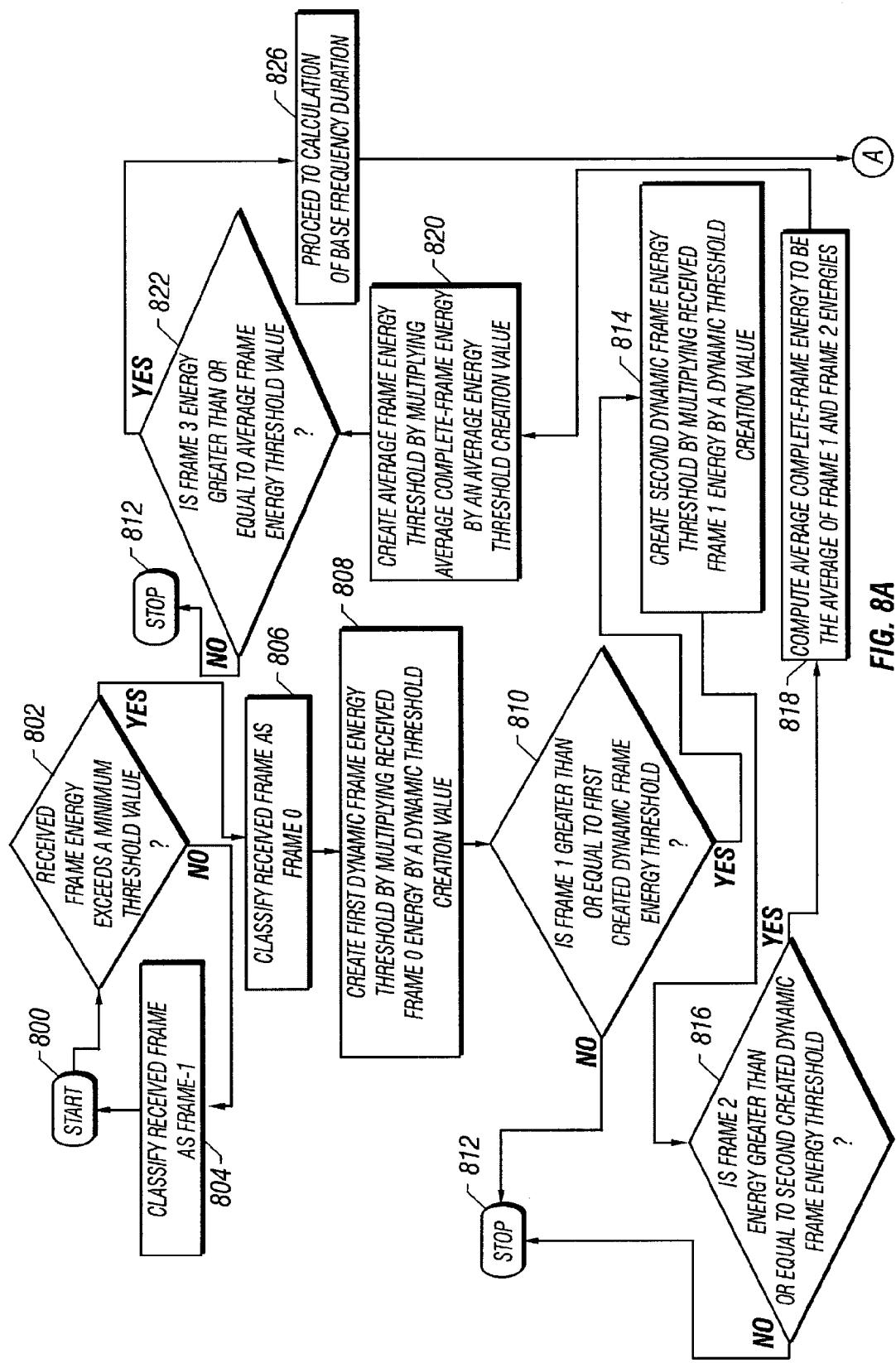
FIGS. 8A and 8B constitute a high-level logic flowchart which illustrates how an embodiment of a 2130 Hz (base) frequency duration measurement unit determines which frames to utilize to calculate the duration of the 2130 Hz (base) frequency, and how such duration is calculated.
Figure 8B:
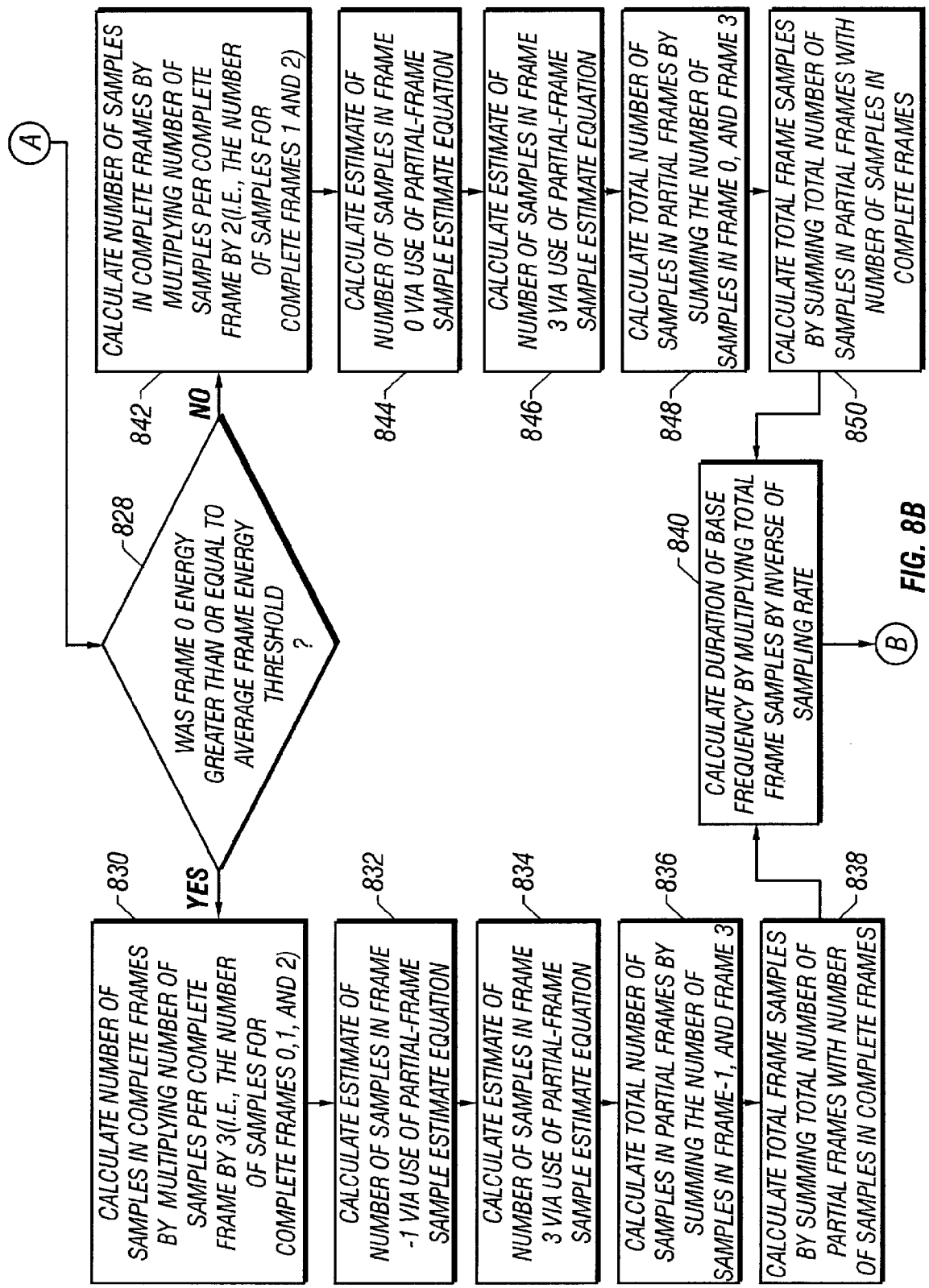

Referring now to FIGS. 8A and 8B, which constitute a high-level logic flowchart which illustrates how an embodiment of 2130 Hz (base) frequency duration measurement unit 604 determines which frames to utilize to calculate the duration of the 2130 Hz (base) frequency, method step 800 shows the start of the process. Method step 802 depicts the determination of whether a received frame's (e.g., received frame A 504) calculated energy exceeds a preset minimal energy threshold (the preset minimum threshold is empirically determined and set by the system designer). Method step 804 illustrates that in the event that the preset minimum threshold is not exceeded, then the received frame is classified as frame (−1). Thereafter, the process returns to method step 802 and proceeds from that point.

In the event that a received frame energy does exceed the preset minimum threshold, the process proceeds to method step 806 wherein the received frame is classified as frame 0, and provided the flow does not terminated, subsequent frames will be referenced relative to the frame classified as frame 0 (i.e., the next 3 sequentially-received frames will be classified frame 1, 2, and 3). Thereafter, the process proceeds to method step 808 which shows that a first dynamic frame threshold energy is created by multiplying the energy for frame 0 by a dynamic threshold creation value (an empirically determined value set by the system designer). Method step 810 depicts the comparison of frame 1 energy to the first dynamic creation frame threshold. In the event frame 1 energy does not exceed the first dynamic threshold the process proceeds to method step 812 and terminates.

In the event that frame 1 energy does exceed the first dynamic threshold, the process proceeds to method step 814 which illustrates that a second dynamic frame threshold energy is created by multiplying the energy for frame 1 by a dynamic threshold creation value (an empirically determined value set by the system designer). Method step 816 depicts the comparison of frame 2 energy to the second dynamic creation frame threshold. In the event that frame 2 energy does not exceed the second dynamic threshold the process proceeds to method step 812 and terminates.

In the event that frame 2 energy does exceed the second dynamic threshold, the process proceeds to method step 818 which illustrates the computation of an average complete-frame energy by averaging the computed energy for frame 1 and frame 2. Thereafter, method step 820 shows the creation of an average frame energy threshold by multiplying the average complete frame energy by an average frame energy creation value (an empirically determined value set by the system designer).

Method step 822 depicts that the comparison of frame 3 energy to the average frame energy threshold. In the event that frame 3 energy does not exceed the average frame energy threshold, the process proceeds to method step 812 and terminates.

In the event that frame 3 energy does exceed the average frame energy threshold, the process proceeds to method step 826 which illustrates that the process is to proceed with computation of the duration of the base frequency. The following method steps show how to calculate the duration of the base frequency utilizing the frame energies.

Method step 828 shows the determination of whether the calculated frame 0 energy is greater than or equal to the average frame energy threshold. In the event that the calculated frame energy is greater than the average frame energy, it is determined that frame 0 was a "full" frame (as used following the term "full" will be utilized to refer to frames that have calculated energy values such that it can be determined that virtually every digital sample in the frame contributed to the calculated base frequency energy, while the term "partial" will be utilized to refer to frames that have calculated energy values such that it can be determined that a number of the digital samples in the frame did not contribute to the calculated base frequency energy), and consequently the process proceeds to method step 830 which shows that the number samples for the complete frames is calculated based upon the three complete frames 0, 1, and 2. The number of complete frame samples is calculated by multiplying the number of samples in a complete frame (e.g., 169 samples for the 2130 Hz (base) frequency), by the number of complete frames, or 3 in the case where frames 0, 1, and 2 are complete. Because frame 0 has been found to be a complete frame, it is postulated that frame −1 was a partial frame, it is postulated that the situation illustrated by diagram 706 exists, and thus the process proceeds to method step 832 wherein it is depicted that an estimate of the number of samples for frame −1 is calculated by use of frame −1 energy with the partial-frame sample estimate equation (6), set forth below. Thereafter, the process proceeds to method step 834 wherein is illustrated that an estimate of the number of samples for frame 3 is calculated by use of frame 3 energy with the partial-frame sample estimate equation. Subsequently, the process proceeds to method step 836 wherein is shown that the total number of samples for the partial frames is calculated by summing the estimated number of samples for frame −1 and frame 3. Thereafter, method step 838 depicts that the total number of frame samples is calculated by summing the total number of samples for the partial frames with the calculated number of samples for the complete frames. The process then proceeds to method step 840 which shows the calculation of the base frequency duration by multiplying the total number of frame samples by the inverse of the defined system sampling rate.

In the event that the calculated frame 0 energy is less than the average frame energy threshold, it is determined that frame 0 was a partial energy frame and consequently the process proceeds to method step 842 which shows that the number of samples for the complete frames is calculated for the two full complete frames 1 and 2. The number of complete frame samples is calculated by multiplying the number of samples in a complete frame (e.g., 169 samples for the 2130 Hz frequency) by the number of complete frames, or 2 in this case. Because frame 0 has been found to be a partial energy frame, the process proceeds to method step 844 wherein is depicted that an estimate of the number of samples for frame 0 is calculated by use of frame 0 energy with the partial-frame sample estimate equation. Thereafter, the process proceeds to method step 846 wherein is illustrated that an estimate of the number of samples for frame 3 is calculated by use of frame 3 energy with the partial-frame sample estimate equation. Subsequently, the process proceeds to method step 848 wherein it is shown that the total number of samples for the partial frames is calculated by summing the estimated number of samples for frame 0 and frame 3. Thereafter, method step 850 depicts that the total number of frame samples is calculated by summing the total number of samples for the partial frames with the calculated number samples for the complete frames. The process then proceeds to method step 840 which shows the calculation of the base frequency duration by multiplying the total number of frame samples by the inverse of the defined system sampling rate.

Figure 9A:
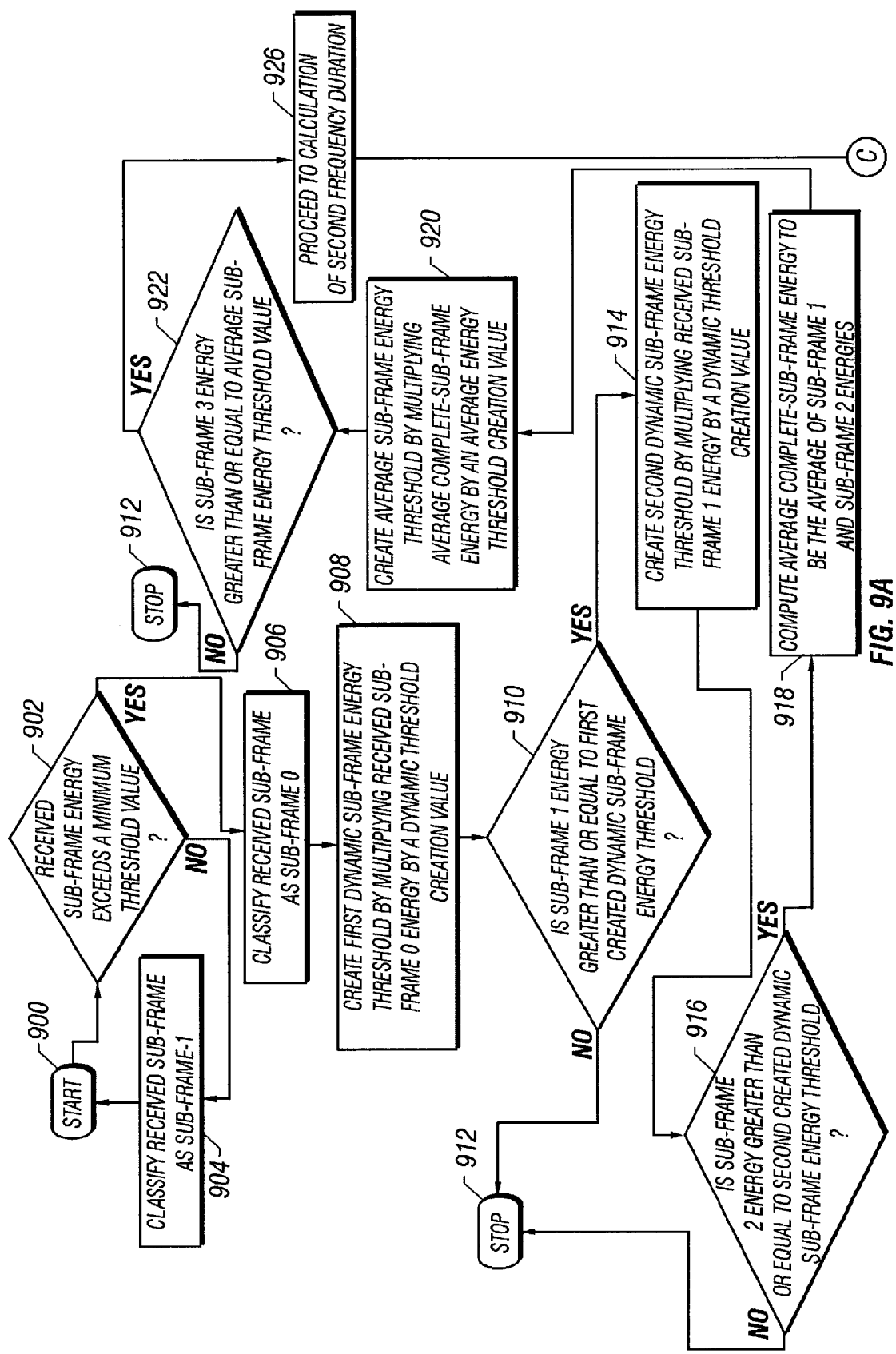

With reference now to FIGS. 9A and 9B, which constitute a high-level logic flowchart which illustrates how an embodiment of a 2750 Hz (second) frequency duration measurement unit determines which sub-frames to utilize to calculate the duration of the 2750 Hz (second) frequency, it can be seen that the process is substantially the same as that depicted in FIGS. 8A and 8B, except that the process of FIGS. 9A and 9B is for sub-frames rather than frames. The process depicted in FIGS. 9A and 9B operate in substantially the same fashion as that described in relation to FIGS. 8A and 8B, except that the process is for sub-frames rather than frames, and thus such discussion will not be repeated here.

Figure 10:
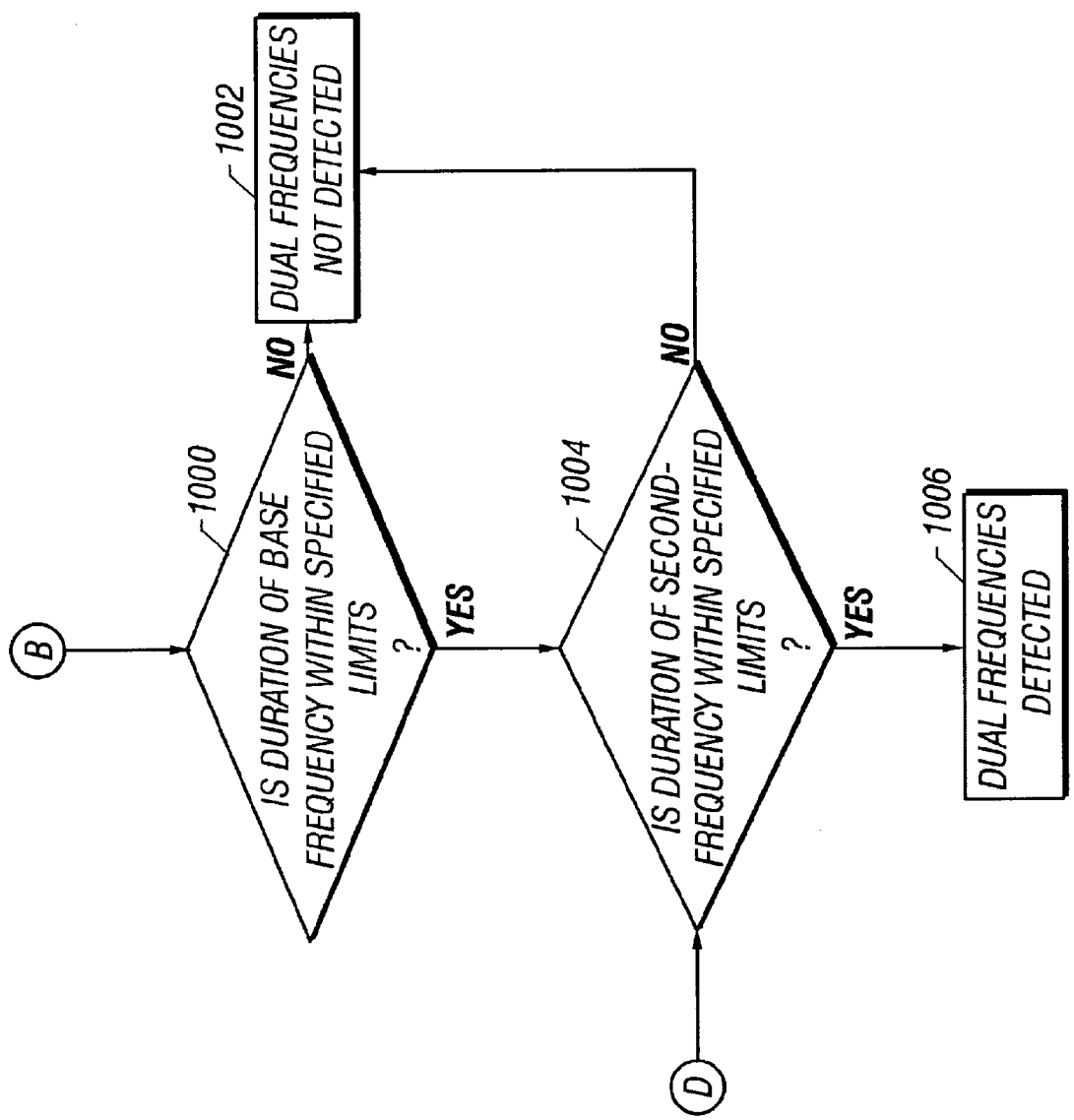
FIG. 10 is a high-level logic flowchart depicting how one embodiment of the present invention determines whether a dual-frequency signal is present.

Referring now to FIG. 10, which is a high-level logic flowchart depicting how one embodiment determines whether a dual-frequency signal is present, method step 1000 depicts that the calculated duration for the base frequency is then compared to the base frequency specified duration limits. In the event that the calculated duration for the base frequency did not fall within such limits the process proceeds to method step 1002 which shows that an output signal 258 indicating that dual frequencies not detected is output.

In the event that the calculated duration for the base frequency did fall within limits, the process proceeds to method step 1004 which depicts that the calculated duration for the second frequency is then compared to the specified second frequency duration limits. In the event that the calculated duration for the second frequency did not fall within such limits, the process proceeds to method step 1002 which shows that an output signal 258 indicating that dual frequencies not detected is output. In the event that the calculated duration for the base frequency did fall within limits, the process proceeds to method step 1006 which shows that an output signal 258 indicating dual frequencies detected is output.

The foregoing has described embodiments of the present invention methodically. Following are two specific examples demonstrating calculations utilized by the dual-frequency embodiment of the present invention to detect the duration of specific designated frequencies. The first example shows calculations performed when a frame 0 is a partial frame. The second example shows calculations performed when a frame 0 is a full frame.

Example 1—Frame 0 As Partial Energy Frame

In this example, the input signal to DTMF detector was a CAS tone at −32 dBm with a duration of 80 ms, or 640 samples at 8 kHz sampling rate. The actual figures for the detector are shown in Table 2 below. Note that the final energy values for frames 0 are slightly lower than for frames 1 and 2: this is because the number of tone samples in the start and ending frame are less than 169 (note that this does not mean there are less than 169 samples—there are still 169 samples but some contain zero energy for the frequency in question); that is, frames 1 and 2 are partial frames, so their energy content will be proportionately lower.

TABLE 2

| Frame # | 2130 Hz energy | 2750 Hz energy |
|---------|----------------|----------------|
| 0 | 30 | 30 |
| 1 | 37 | 36 |
| 2 | 35 | 36 |
| 3 | 27 | 32 |

Since frames 1 and 2 energy measurements were made in frames which contained the full 169 tone samples, these energy values are proportional to the analysis frame length. In fact, the relationship between the frame energy and the analysis length is:

frame energy=h*(analysis length)$^2$ for a complete frame where the constant h is system dependent $$\text{Therefore } \frac{\text{frame 0 energy}}{\text{frame 1 energy}} = \frac{h*(\text{\# of samples in frame 0})^2}{h*(\text{analysis length})^2} \quad \text{Equation (6)}$$

where the unknown constant h cancels out.

Utilizing Equation 6, an estimate of the number of samples present in the two partial frames can be obtained. Effectively, the process is:

First, find the average energy of the two full (energy) frames (i.e., frames 1 and 2), for each tone

| Tone | average energy of frame 1 & 2 |
|------|-------------------------------|
| 2130 | 36 |
| 2750 | 36 |

Thereafter, using Equation 6, for 2130 Hz tone the number of samples in the partial frames can be calculated as follows:

$$(\text{\# of samples in frame 0})^2 = \frac{(\text{frame 0 energy})*(\text{analysis length})^2}{(\text{average energy})} \quad \text{Equation (7)}$$

$$= \frac{30*(169)^2}{36} = 23{,}800$$

\# of samples in frame 0=square root (23,800)=154

Similarly using Equation 6 with frame 3 yields,

\# of samples in frame 3=square root (21,421)=146

Since frames 1 and 2 which are full frames (as described above in relation to FIG. 5) and thus each contain 169 samples, the total number of samples for the complete frames is 338. Consequently, the total sample duration for the 2130 Hz tone is 638 samples which is equivalent to 79.75 ms for an 8 kHz sampling rate.

The total sample duration for the 2759 Hz tone will be calculated by establishing the number of samples for the complete and partial frames and sub-frames.

Using Equation 7, for the 2750 Hz tone the number of samples in the partial frames can be calculated as follows:

\# of normalized samples in sub-frame 0=154

\# of normalized samples in sub-frame 3=159

Since sub-frames 1 and 2 (which were full sub-frames) each contain 169 samples (the sub-frames contain 160 samples, but the normalization factors allows them to be treated as if they contained 169 samples), the total complete sub-frame number of samples was 338. Thus, the total sample duration for the 2750 Hz tone is 651 sub-frame samples which is equivalent to 81.37 ms for an 8 kHz sampling rate.

In this particular example, the detection was empirically performed under controlled conditions, so that the actual number of samples in each frame and the total sample duration of each tone were known accurately. For the 2130 and 2750 Hz tones:

# of samples in both frame and sub-frame 0=154 # of samples in both frame and sub-frame 3=148 total signal duration=80 ms (640 samples) Thus, in this particular case, the accuracy of the signal duration was within 1.7% of the true value.

Example 2—Frame 0 Full Energy Frame

In this example, the input signal to the detector was a CAS tone at −14 dBm with a duration of 75 ms or 600 samples at 8 kHz sampling rate. The actual figures for the detector are shown in Table 3 below. Note that the final energy values for frames −1 and 3 are lower than for frames 0, 1 and 2: this is because the number of tone samples in the frame prior to frame 0 and frame 3 are less than 169 (note that this does not mean there are less than 169 samples—there are still 169 samples but some contain zero energy for the frequency in question); that is, frames −1 and 3 are partial frames, so their energy content will be proportionately lower.

TABLE 3

| Frame # | 2130 Hz energy | 2750 Hz energy |
| --- | --- | --- |
| −1 | 82 | 36 |
| .0 | 2248 | 2170 |
| 1 | 2231 | 2204 |
| 2 | 2236 | 2256 |
| 3 | 330 | 372 |

Here, frame −1 refers to the frame prior to frame 0 . In order to detect this tone correctly, the energy values from frames −1 and 3 would be employed in conjunction with the 3 frames which contain a full 169 tone samples as follows.

First, find the average energy of the final two full frames (i.e., frames 1 and 2), for each tone.

| Tone | average energy of frame 1 & 2 |
| --- | --- |
| 2130 | 2234 |
| 2750 | 2230 |

Using Equation 7, for the number of partial frame samples for the 2130 Hz tone can be estimated. For partial frame (−1):

$$(\# \text{ of samples in frame} - 1)^{\wedge}2 = \frac{(\text{frame} - 1 \text{ energy}) * (\text{analysis length})^{\wedge}2}{(\text{average energy})}$$

$$= \frac{82 * (169)^{\wedge}2}{2234} = 1048$$

(# of samples in frame − 1) = square root (1048) = 32

Similarly using Equation 7 the number of partial frame samples for partial frame 3:

# of samples in frame 3=square root (4219)=65

Therefore, since frames 1, 2 and 3 contain 169 samples, the total sample duration for the 2130 Hz tone is 604 samples which is equivalent to 75.5 ms for an 8 kHz sampling rate.

Similarly, Equation 7 can be utilized to calculate the duration of the 2750 Hz tone are:

# of normalized samples in sub-frame −1=21 # of normalized samples in sub-frame 3=69

Therefore, since sub-frames 1, 2 and 3 contain 169 samples (the sub-frames actually contain 160 samples, but use of the normalization factors allow them to be treated as if they contain 169 sample), the total sample duration for the 2750 Hz tone is 597 samples which is equivalent to 74.625 ms for an 8 kHz sampling rate.

In this particular example, the detection was empirically performed under controlled conditions so that the actual number of samples in each frame and the total sample duration of each tone were known accurately. These figures are shown below: For the 2130 and 2750 Hz tones:

# of samples in both frame and sub-frame −1=29 # of samples in both frame and sub-frame 3=64 total signal duration=75 ms (600 samples)

Thus, in this particular case, the accuracy of the signal duration was within 0.67% of the true value. It can such a scheme could be employed to increase the accuracy of determining whether a detected tone was within a specific minimum and maximum duration. This would make the tone detector more robust when detecting tones of specific duration characteristics.

It should be noted that, although it is necessary to use a divide and a square root to obtain the actual sample count, one could avoid the square root by using the square of the sample count as the reference value, thus reducing the arithmetic complexity of the proposed scheme.

Although the application described is specific, such techniques can be used to improve the accuracy in estimating the signal duration of audio band tones in other, similar tone detection applications.

The foregoing detailed description set forth various embodiments of the present invention via the use of block diagrams, flowcharts, and examples. It will be understood as notorious by those within the art that each block diagram component, flowchart step, and operations and/or components illustrated by the use of examples can be implemented, individually and/or collectively, by a wide range of hardware, software, firmware, or any combination thereof. In one embodiment, the present invention is implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A method for frequency detection, said method comprising:

receiving an analog signal;

creating a stream of data samples from the analog signal; and calculating a duration of one or more analog frequencies within the analog signal on the basis of the stream of digital data, said calculating the duration of one or more analog frequencies including calculating a duration of a base frequency selected from the one or more analog frequencies.

2. The method of claim 1, wherein said calculating the duration of a base frequency further comprises:

calculating a base frequency duration utilizing one or more calculated frame energies.

3. The method of claim 2, wherein said calculating a base frequency duration utilizing at least one calculated frame energy further comprises:

calculating a total number of samples for one or more frames of samples utilizing the one or more calculated frame energies; and calculating a base frequency duration utilizing the total number of samples for the one or more frames of samples.

4. The method of claim 3, wherein said calculating a total number of samples for one or more frames of samples utilizing the one or more calculated frame energies further comprises:

constructing the one or more frames of samples from the stream of data samples;

calculating a frame energy for each of the one or more frames of samples; and calculating the total number of samples for the one or more frames of samples utilizing the frame energy for each of the one or more frames.

5. The method of claim 4, wherein said calculating a frame energy for each of the one or more frames of samples further comprises:

calculating an energy contained within said each of the one or more frames of samples by utilizing the Goertzel Algorithm.

6. The method of claim 4, wherein said calculating the total number of samples for the one or more frames of samples further comprises:

calculating a total number of samples in one or more partial frames;

calculating a total number of samples in one or more complete frames; and determining the total number of samples for the one or more frames of samples by summing the total number of samples in partial frames with the total number of samples in complete frames.

7. The method of claim 6, wherein said determining the total number of samples for the one or more frames of samples further comprises:

comparing the frame energy for each of the one or more frames of samples to at least one complete-frame threshold value;

classifying each of the one or more frames whose frame energy fell below the complete frame threshold value as a partial frame; and classifying each of the one or more frames whose frame energy was at least equal to the complete frame threshold value as a complete frame.

8. The method of claim 1, wherein said calculating a duration of one or more analog frequencies further comprises:

calculating a duration of each of the one or more analog frequencies other than the base frequency.

9. The method of claim 8, wherein said calculating a duration of each of the one or more analog frequencies other than the base frequency further comprises:

calculating the duration of each of the one or more analog frequencies other than the base frequency utilizing one or more one calculated frequency-specific sub-frame energies.

10. The method of claim 9, wherein said calculating the duration of each of the one or more analog frequencies other than the base frequency utilizing one or more one calculated frequency-specific sub-frame energies further comprises:

calculating a total number of samples for one or more second-frequency sub-frames of samples utilizing a sub-frame energy for each of the one or more second-frequency sub-frames; and calculating a second-frequency duration utilizing the total number of samples for the one or more second-frequency sub-frames of samples.

11. The method of claim 10, wherein said calculating a total number of samples for one or more second-frequency sub-frames of samples utilizing a sub-frame energy for each of the one or more second-frequency sub-frames further comprises:

constructing the one or more second-frequency sub-frames of samples from the stream of data samples calculating a second-frequency sub-frame energy for each of the one or more second-frequency sub-frames of samples; and calculating the total number of samples for the one or more second-frequency sub-frames of samples utilizing the fame energy for each of the one or more second frequency sub-frames.

12. The method of claim 11, wherein said calculating a second-frequency sub-frame energy for each of the one or more second-frequency sub-frames of samples further comprises:

calculating an energy contained within said one or more of the second-frequency sub-frames of samples by utilizing the Goertzel Algorithm.

13. The method of claim 11, wherein said calculating the total number of samples for the one or more second-frequency sub-frames of samples further comprises:

calculating a total number of samples in one or more partial second-frequency sub-frames;

calculating a total number of samples in one or more complete second-frequency sub-frames; and determining the total number of samples for the one or more second-frequency sub-frames of samples by summing the total number of samples in the one or more partial second-frequency sub-frames with the total number of samples in the one or more complete second-frequency sub-frames.

14. The method of claim 13, wherein said determining the total number of samples for the one or more second-frequency sub-frames of samples further comprises:

comparing the frame energy for each of the one or more second-frequency sub-frames of samples to at least one complete-sub-frame threshold value;

classifying each of the one or more frames whose frame energy fell below the complete frame threshold value as a partial frame; and classifying each of the one or more second-frequency sub-frames whose frame energy was at least equal to the complete-sub-frame threshold value as a complete sub-frame.

15. A method for frequency detection, said method comprising:

receiving an analog signal;

creating a stream of data samples from the analog signal;

calculating a duration of one or more analog frequencies within the analog signal on the basis of the stream of digital data;

comparing the calculated durations for the one or more analog frequencies with one or more specified durations; and outputting a signal indicative of results of said step of comparing.

16. A system for frequency detection, said system comprising:

means for receiving an analog signal;

means for creating a stream of data samples from the analog signal; and means for calculating a duration of one or more analog frequencies within the analog signal on the basis of the stream of digital data, said means for calculating the duration of one or more analog frequencies including means for calculating a duration of a base frequency selected from the one or more analog frequencies.

17. The system of claim 16, wherein said means for calculating the duration of a base frequency further comprises:

means for calculating a base frequency duration utilizing one or more calculated frame energies.

18. The system of claim 17, wherein said means for calculating a base frequency duration utilizing at least one calculated frame energy further comprises:

means for calculating a total number of samples for one or more frames of samples utilizing the one or more calculated frame energies; and means for calculating a base frequency duration utilizing the total number of samples for the one or more frames of samples.

19. The system of claim 18, wherein said means for calculating a total number of samples for one or more frames of samples utilizing the one or more calculated frame energies further comprises:

means for constructing the one or more frames of samples from the stream of data samples;

means for calculating a frame energy for each of the one or more frames of samples; and means for calculating the total number of samples for the one or more frames of samples utilizing the frame energy for each of the one or more frames.

20. The system of claim 19, wherein said means for calculating a frame energy for each of the one or more frames of samples further comprises:

means for calculating an energy contained within said each of the one or more frames of samples by utilizing the Goertzel Algorithm.

21. The system of claim 19, wherein said means for calculating the total number of samples for the one or more frames of samples further comprises:

means for calculating a total number of samples in one or more partial frames;

means for calculating a total number of samples in one or more complete frames; and means for determining the total number of samples for the one or more frames of samples by summing the total number of samples in partial frames with the total number of samples in complete frames.

22. The system of claim 21, wherein said means for determining the total number of samples for the one or more frames of samples further comprises:

means for comparing the frame energy for each of the one or more frames of samples to at least one complete-frame threshold value;

means for classifying each of the one or more frames whose frame energy fell below the complete frame threshold value as a partial frame; and means for classifying each of the one or more frames whose frame energy was at least equal to the complete frame threshold value as a complete frame.

23. The system of claim 16, wherein said means for calculating a duration of one or more analog frequencies further comprises:

means for calculating a duration of each of the one or more analog frequencies other than the base frequency.

24. The system of claim 23, wherein said means for calculating a duration of each of the one or more analog frequencies other than the base frequency further comprises:

means for calculating the duration of each of the one or more analog frequencies other than the base frequency utilizing one or more one calculated frequency-specific sub-frame energies.

25. The system of claim 24, wherein said means for calculating the duration of each of the one or more analog frequencies other than the base frequency utilizing one or more one calculated frequency-specific sub-frame energies further comprises:

means for calculating a total number of samples for one or more second-frequency sub-frames of samples utilizing a sub-frame energy for each of the one or more second-frequency sub-frames; and means for calculating a second-frequency duration utilizing the total number of samples for the one or more second-frequency sub-frames of samples.

26. The system of claim 25, wherein said means for calculating a total number of samples for one or more second-frequency sub-frames of samples utilizing a sub-frame energy for each of the one or more second-frequency sub-frames further comprises means for constructing the one or more second-frequency sub-frames of samples from the stream of data samples means for calculating a second-frequency sub-frame energy for each of the one or more second-frequency sub-frames of samples; and means for calculating the total number of samples for the one or more second-frequency sub-frames of samples utilizing the fame energy for each of the one or more second frequency sub-frames.

27. The system of claim 26, wherein said means for calculating a second-frequency sub-frame energy for each of the one or more second-frequency sub-frames of samples further comprises:

means for calculating an energy contained within said one or more of the second-frequency sub-frames of samples by utilizing the Goertzel Algorithm.

28. The system of claim 26, wherein said means for calculating the total number of samples for the one or more second-frequency sub-frames of samples further comprises:
   means for calculating a total number of samples in one or more partial second-frequency sub-frames;
   means for calculating a total number of samples in one or more complete second-frequency sub-frames; and
   means for determining the total number of samples for the one or more second-frequency sub-frames of samples by summing the total number of samples in the one or more partial second-frequency sub-frames with the total number of samples in the one or more complete second-frequency sub-frames.

29. The system of claim 28, wherein said means for determining the total number of samples for the one or more second-frequency sub-frames of samples further comprises:
   means for comparing the frame energy for each of the one or more second-frequency sub-frames of samples to at least one complete-sub-frame threshold value;
   means for classifying each of the one or more frames whose frame energy fell below the complete frame threshold value as a partial frame; and
   means for classifying each of the one or more second-frequency sub-frames whose frame energy was at least equal to the complete-sub-frame threshold value as a complete sub-frame.

30. A system for frequency detection, said system comprising:
   means for receiving an analog signal;
   means for creating a stream of data samples from the analog signal; and
   means for calculating a duration of one or more analog frequencies within the analog signal on the basis of the stream of digital data;
   means for comparing the calculated durations for the one or more analog frequencies with one or more specified durations; and
   means for outputting a signal indicative of results of said step of comparing.

31. A system for frequency detection, said system comprising:
   an analog to digital converter having an analog input and a digital output;
   said output of said analog to digital converter operably connected to a multi-frequency detector having an input and an output, said multi-frequency detector having an input and an output including
      at least one analog frequency detector having an input and an output, and wherein said analog frequency detector input is operably coupled to said digital output of said analog to digital converter; and
      at least one base frequency duration measurement unit operably connected to said output of said analog frequency detector.

32. The system of claim 31, wherein said at least one analog frequency detector further comprises:
   at least one Goertzel Discrete Fourier Transform energy calculation unit.

33. The system of claim 32, wherein said at least one base frequency duration measurement unit further comprises:
   at least one frame-based total frame samples calculation unit.

* * * * *

UNITED STATES PATENT AND TRADEMARK OFFICE
CERTIFICATE OF CORRECTION

PATENT NO.      : 6,370,555 B1
DATED           : April 9, 2002
INVENTOR(S)     : John G. Bartkowiak It is certified that error appears in the above-identified patent and that said Letters Patent is hereby corrected as shown below:

Column 18,
Line 14, delete "one";
Line 18, delete the second occurrence of "one";
Line 39, replace "fame" with -- frame --;

Column 20,
Line 32, delete the second occurrence of "one"; and
Line 37, delete "one".

Signed and Sealed this

Twenty-ninth Day of July, 2003

JAMES E. ROGAN
*Director of the United States Patent and Trademark Office*